(12) United States Patent
Pisklak et al.

(10) Patent No.: US 10,569,383 B2
(45) Date of Patent: Feb. 25, 2020

(54) FLANGED OPTICAL ENDPOINT DETECTION WINDOWS AND CMP POLISHING PADS CONTAINING THEM

(71) Applicant: Rohm and Haas Electronic Materials CMP Holdings, Inc., Newark, DE (US)

(72) Inventors: Stephen G. Pisklak, Wilmington, DE (US); Jeffrey James Hendron, Elkton, MD (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 0 days.

(21) Appl. No.: 15/705,561

(22) Filed: Sep. 15, 2017

(65) Prior Publication Data

US 2019/0084120 A1 Mar. 21, 2019

(51) Int. Cl.
| | | |
|---|---|---|
| *B24B 37/013* | (2012.01) | |
| *B24B 37/24* | (2012.01) | |
| *B24B 37/26* | (2012.01) | |
| *B24B 37/20* | (2012.01) | |
| *B24D 18/00* | (2006.01) | |
| *B24B 37/22* | (2012.01) | |

(52) U.S. Cl.
CPC .......... *B24B 37/013* (2013.01); *B24B 37/205* (2013.01); *B24B 37/22* (2013.01); *B24B 37/24* (2013.01); *B24B 37/26* (2013.01); *B24D 18/0009* (2013.01)

(58) Field of Classification Search
CPC ..... B24B 37/205; B24B 37/013; B24B 37/22; B24B 37/24; B24B 37/26; G01B 11/06; B24D 18/0009

USPC ............................ 451/6, 534, 537, 538, 533
See application file for complete search history.

(56) References Cited

U.S. PATENT DOCUMENTS

| | | | |
|---|---|---|---|
| 5,893,796 A | 4/1999 | Birang et al. | |
| 6,454,630 B1 * | 9/2002 | Tolles ................... | B24B 37/013 451/287 |
| 6,524,164 B1 * | 2/2003 | Tolles ................... | B24B 37/013 451/28 |
| 6,676,717 B1 * | 1/2004 | Birang ................. | B24B 37/013 428/131 |
| 6,994,607 B2 * | 2/2006 | Wiswesser ............ | B24B 37/205 451/285 |
| 7,112,119 B1 * | 9/2006 | Swedek ................ | B24B 37/205 451/533 |
| 7,195,539 B2 | 3/2007 | Turner et al. | |

(Continued)

FOREIGN PATENT DOCUMENTS

JP 2003188124 A * 7/2003 ............. B24B 21/04

*Primary Examiner* — George B Nguyen
(74) *Attorney, Agent, or Firm* — Andrew Merriam; Blake T. Biederman

(57) ABSTRACT

The present invention provides a chemical mechanical (CMP) polishing pad with a top surface, one or more apertures adapted to receive an endpoint detection window, an underside having a recessed portion and having one or more flanged endpoint detection windows (windows), each window having a flange adapted to fit snugly into the recessed portion of the underside of the polishing layer, the flange having a thickness slightly less than the depth of the recessed portion of the polishing layer (to allow for adhesive), having a detection area that fits snugly into an aperture in the polishing layer so that its top surface that lies substantially flush with the top surface of the polishing layer.

8 Claims, 2 Drawing Sheets

(56) References Cited

U.S. PATENT DOCUMENTS

| | | |
|---|---|---|
| 7,264,536 B2 | 9/2007 | Wiswesser et al. |
| 7,442,111 B2 | 10/2008 | Lim et al. |
| 7,927,183 B2 | 4/2011 | Fukuda et al. |
| 8,393,940 B2 | 3/2013 | Swedek et al. |
| 8,920,219 B2 * | 12/2014 | Allison ................. B24B 37/205 451/527 |
| 9,156,121 B2 | 10/2015 | Thomas et al. |
| 2002/0115379 A1 * | 8/2002 | Sevilla ................. B24B 37/013 451/6 |
| 2004/0127145 A1 * | 7/2004 | Takahashi ............ B24B 37/205 451/6 |
| 2004/0253910 A1 * | 12/2004 | Lim ..................... B24B 37/013 451/5 |
| 2005/0060943 A1 * | 3/2005 | Turner ................. B24B 37/205 51/297 |
| 2006/0178099 A1 * | 8/2006 | Hishiki ................ B24B 37/205 451/521 |
| 2014/0038501 A1 | 2/2014 | Birang et al. |
| 2015/0004888 A1 | 1/2015 | Swedek et al. |
| 2015/0298286 A1 | 10/2015 | Nakamura |

\* cited by examiner

FLANGED OPTICAL ENDPOINT DETECTION WINDOWS AND CMP POLISHING PADS CONTAINING THEM

The present invention relates to a chemical mechanical polishing (CMP polishing) pad with one or more flanged endpoint detection windows and methods for making the same. More particularly, the present invention relates to a CMP polishing pad comprising (i) a CMP polishing layer having in it (a) a top surface with a series of grooves, for each of one or more endpoint detection windows an aperture and an optional exclusion zone, and (b) and an underside which contains for each of the one or more endpoint detection windows a recessed portion having a depth that extends laterally coterminous with each exclusion zone; (ii) a sub pad or sub layer; and (iii) one or more endpoint detection windows, each having a flange adapted to fit snugly into the recessed portion of the underside of the polishing layer and having a thickness equal to or slightly less than the depth of the recessed portion of the polishing layer, a detection area that fits snugly into an aperture in the polishing layer and a top surface that lies flush with the top surface of the polishing layer.

In the fabrication of integrated circuits and other electronic devices, multiple thin layers of conducting, semiconducting and dielectric materials are deposited on and then at least partially removed from a surface of a semiconductor wafer. As layers of materials are sequentially deposited and removed, the uppermost surface of the wafer becomes non-planar. Because subsequent semiconductor processing (e.g., metallization) requires the wafer to have a flat surface, the wafer needs to be planarized. Chemical mechanical planarization, or chemical mechanical polishing (CMP), has commonly been used to planarize integrated circuits and other electronic device substrates, such as semiconductor wafers, during fabrication. In conventional CMP, a substrate is mounted on a carrier assembly and positioned in contact with a polishing pad in a CMP apparatus. The carrier assembly applies a controlled pressure to the substrate by pressing it against the CMP polishing pad while the pad is moved (e.g., rotated) relative to the substrate by an external driving force. Simultaneously therewith, a polishing medium (e.g., slurry) provided between the wafer and the CMP polishing pad acts to polish and planarize the substrate surface by the chemical and mechanical action of the pad surface and the polishing medium.

One challenge presented in CMP polishing is determining when the substrate has been polished to the desired extent. In situ optical methods for determining polishing endpoints have been developed wherein the methods comprise monitoring a reflected optical signal at a one or more wavelength in the visible spectrum (e.g., 400 to 700 nm), the ultraviolet spectrum (200 to 400 nm), or the infrared spectrum (e.g., 700 to 1100 nm). In monitoring an optical signal, the reflectivity of the substrate changes as the composition at the substrate surface changes from one material to another. This change in reflectivity is then used to detect the CMP polishing endpoint. To accommodate these optical end point measuring techniques, CMP polishing pads have been developed having endpoint detection windows.

The transparency of the endpoint detection windows means that the windows are formed from materials that differ from the materials used to make the CMP polishing pads. Accordingly, the endpoint detection window has to be fastened or sealingly engaged with the rest of the CMP polishing pad during or after molding or casting the material to make the CMP polishing pad. For example, endpoint detection windows can be glued to, welded to, cast with and even reacted with the CMP polishing pad materials. Nevertheless, poor adhesion between any endpoint detection windows and the CMP polishing pad materials can lead to polishing medium leakage or can cause the window to come loose from the pad. Leakage presents problems because leaking polishing medium can both interfere with endpoint detection and change the compressive properties of the sub pad.

One method to address leakage is to cast the window material with the rest of the CMP polishing pad material. However, shaping a cast CMP polishing pad having an endpoint detection window has proven difficult because the materials differ and their tolerance to shaping methods, such as cutting or skiving the material into layers can lead to undesired surface defects or deformities and window buckling. In an alternative method of making plug-in-place windows comprises adhering the window directly to a subpad or subbing layer. However, the adhesion area is small and known subpad adhesives have not worked well enough to prevent leakage around the window or separation of window and pad.

U.S. Pat. No. 5,893,796(A), to Birang et al. discloses an endpoint detection window sitting on a subpad ledge (see FIG. 3A) and a flanged window or plug is adhered to the underside of the top pad (see FIG. 3D). In the flanged window, the top surface of a two level plug is co-planar with the top surface of the CMP polishing pad. Unfortunately, the lower portion (604) of the plug (600) is adhered to the underside of the top polishing layer (22) and is highly dependent on the adhesion of a small portion of the plug to a bottom face in the polishing layer to prevent leakage in use. Further, the backing layer or subpad has a large recess that accommodates the entire underside of the two level plug and does not support it. A large recess can negatively impact polishing rate or consistency.

The present inventors have endeavored to provide CMP polishing pads having one or more endpoint detection windows that ensure no leakage occurs and methods for making the same.

STATEMENT OF THE INVENTION

1. In accordance with the present invention, chemical mechanical (CMP) polishing pads for polishing a substrate chosen from at least one of a magnetic substrate, an optical substrate and a semiconductor substrate comprise (i) a CMP polishing layer or top layer of a polymer material, preferably, a polyurethane foam layer, having in it (a) a top surface having in it a series of grooves, preferably, continuous concentric grooves, having for each of one or more, preferably, one to three, endpoint detection windows an aperture A extending all the way through the polishing layer and having a center point when viewed looking in a direction normal down on the top of the polishing layer when in use, and, preferably, an exclusion zone wherein there are no grooves for each of one or more endpoint detection windows and (b) and a substantially flat underside which contains for each of the one or more endpoint detection windows a recessed portion having a constant depth that extends laterally coterminous with the lateral dimension of each exclusion zone; (ii) a sub pad or sub layer of a polymeric material, such as a polymer, preferably, polyurethane, interpenetrated non-woven web or a polymeric foam, such as polyurethane, having a substantially flat top surface, having a flat underside surface and having for each of one or more endpoint detection windows an aperture extending all the way through the sub pad, having a center point aligned to match the center point of each aperture A in the polishing layer, preferably, and having the same or, more preferably, a smaller lateral dimension as the aperture A; and (iii) one or more, such as one to six, or, preferably, one to three endpoint detection windows, such as a transparent polymer window, preferably, polyurethane, each window having a flange adapted to fit snugly into the recessed portion of the underside of the polishing layer and having a thickness equal to or, to accommodate an adhesive layer, slightly less than the depth of the recessed portion of the (i) polishing layer, and having a detection area that fits snugly into an aperture in the polishing layer so that its top surface that lies substantially flush with the top surface of the polishing layer.

2. In accordance with the chemical mechanical polishing pad of the present invention as in item 1, above, wherein the (ii) sub pad comprises a polymeric material having a hardness that lies within the Shore O scale (ASTM D2240-15 (2015)) and that is less than the hardness of the polishing layer.

3. In accordance with the chemical mechanical polishing pad of the present invention as in item 1, above, wherein each of the (iii) one or more endpoint detection windows is adhered to each of the (i) polishing layer and the (ii) sub pad via ultrasonic welding or with an adhesive chosen from pressure sensitive adhesives, hot melt adhesives, contact adhesives and combinations thereof.

4. In accordance with the chemical mechanical polishing pad of the present invention as in item 3, above, wherein each of the (iii) one or more endpoint detection windows is adhered to the (i) polishing layer with a pressure sensitive adhesive and is adhered to the (ii) sub pad with a pressure sensitive adhesive or a hot melt adhesive.

5. In accordance with the chemical mechanical polishing pad of the present invention as in any one of items 1, 2, 3, or 4, above, wherein the CMP polishing pad contains no gap or open space of greater than 150 µm or, preferably, 50 µm in any dimension within the one or more exclusion areas or within the lateral area bound by the flange of the (iii) one or more endpoint detection windows and between the underside of the sub pad and the top surface of the polishing layer.

6. In another aspect, the present invention provides methods for making chemical mechanical (CMP) polishing pads having one or more endpoint detection windows comprising forming (i) a polishing layer having a center point, (a) a top surface with a series of grooves, preferably, continuous concentric grooves and, preferably, an exclusion zone for each of the one or more, such as one to six, or, preferably, one to three, endpoint detection windows wherein there are no grooves for each of one or more endpoint detection windows, and (b) a substantially flat underside which may or may not contain a recessed portion of a constant depth and adapted to receive a flange of each of one or more endpoint detection windows, such as by casting and skiving (in which the polishing layer will not contain the recessed portion) or by spraying and curing a polymeric material, preferably, a polyurethane foam and (b) a substantially flat underside; if the (i) polishing layer does not have a recessed portion, milling the (b) underside polishing layer for each of the one or more endpoint detection windows, to a constant depth and a lateral dimension to accept a flange of each of one or more endpoint detection windows and, if used, any adhesive therefore to form the recessed portion; forming, for each of the one or more endpoint detection windows an aperture A in the polishing layer having a given lateral size or dimension, such as by milling the aperture A;

forming (iii) a flanged endpoint detection window for each aperture and recessed portion of the polishing layer, the endpoint detection window having a detection area equal in lateral size to a corresponding aperture in the polishing layer and having a flange of the same or, to accommodate an adhesive layer if used, slightly lesser height slightly lesser height and the same lateral dimension as the corresponding recessed portion of the polishing layer by molding a transparent polymeric material, such as by injection molding, or by casting or molding a disk of the material and then milling, routing, or forging the disk to make the flange; and adhering each of the corresponding one or more endpoint detection windows into the recessed portion of the polishing layer so that the resulting polishing layer, not counting grooves, has the same thickness throughout and the top surface of each of the one or more (iii) endpoint detection windows is substantially flush to the top surface of the polishing layer; and, then providing (ii) a sub pad of a polymeric material, such as a polymer, preferably, polyurethane, interpenetrated nonwoven web or a polymeric foam, such as polyurethane, having center point, a substantially flat top surface and a flat underside; forming one or more apertures in the sub pad corresponding to each aperture A in the polishing layer, having the same shape as the corresponding aperture A and, preferably, having the same, or, more preferably, a smaller lateral size or dimension as the corresponding aperture A in the polishing layer, whereby the apertures are aligned so that when the center points of the polishing layer and the sub pad are aligned with the polishing layer placed on top of the sub pad with its one or more recessed portions lying against the top side of the sub pad, the apertures in each of the polishing layer and sub pad align in location, and shape, preferably, with the one or more apertures in the sub pad being the same, or, more preferably, a smaller size than each corresponding aperture A; aligning and adhering the underside of the polishing layer, and the bottom of the flange of each of the one or more endpoint detection windows and the top surface of the sub pads to form the CMP polishing pad via ultrasonic welding or with an adhesive chosen from pressure sensitive adhesives, hot melt adhesives, contact adhesives and combinations thereof.

7. In accordance with the methods of the present invention as in item 5, above, wherein each of the (iii) one or more endpoint detection windows is adhered to the (i) polishing layer with a pressure sensitive adhesive and is adhered to the (ii) sub pad with a pressure sensitive adhesive or a hot melt adhesive.

DETAILED DESCRIPTION

Figure 1:
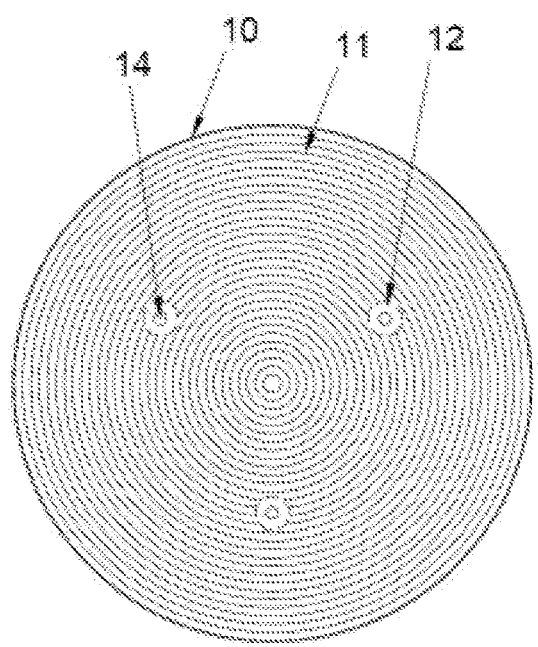
FIG. 1 is a top view of a CMP polishing pad with a flanged endpoint detection window.

Unless otherwise indicated, conditions of temperature and pressure are ambient temperature and standard pressure. All ranges recited are inclusive and combinable.

Unless otherwise indicated, any term containing parentheses refers, alternatively, to the whole term as if no parentheses were present and the term without them, and combinations of each alternative. Thus, the term "(poly) isocyanate" refers to isocyanate, polyisocyanate, or mixtures thereof.

All ranges are inclusive and combinable. For example, the term "a range of 50 to 3000 cPs, or 100 or more cPs" would include each of 50 to 100 cPs, 50 to 3000 cPs and 100 to 3000 cPs.

As used herein, the term "ASTM" refers to publications of ASTM International, West Conshohocken, Pa.

As used herein, the term "polyisocyanate" means any isocyanate group containing molecule having three or more isocyanate groups, including blocked isocyanate groups.

As used herein, the term "polyurethanes" refers to polymerization products from difunctional or polyfunctional isocyanates, e.g. polyetherureas, polyisocyanurates, polyurethanes, polyureas, polyurethaneureas, copolymers thereof and mixtures thereof.

As used herein, the term "reaction mixture" includes any non-reactive additives, such as microelements and any additives to lower wet hardness (Shore D or Shore A according to ASTM D2240-15 (2015)) of a polyurethane reaction product in the polishing pad.

As used herein, the term "semiconductor wafer" is intended to encompass a semiconductor substrate, such as an unpatterned semiconductor or one having a pattern, a semiconductor device, various packages for various levels of interconnection, including a single-chip wafer or a multiple-chip wafer, a substrate for a light emitting diode (LED), or other assemblies requiring solder connections.

As used herein, the term "semiconductor substrate" is defined to mean any construction comprising semiconductive material. A semiconductor substrate includes semiconductor devices and any substrate having one or more semiconductor layers or structures which include active or operable portions of semiconductor devices.

As used herein, the term "semiconductor device" refers to a semiconductor substrate upon which at least one microelectronic device has been or is being fabricated.

As used herein, the terms "Shore D hardness", "Shore 0 hardness" and "Shore A hardness" are the hardness values of a given material as measured after a given time period according to ASTM D2240-15 (2015), "Standard Test Method for Rubber Property—Durometer Hardness". Hardness was measured on a Rex Hybrid hardness tester (Rex Gauge Company, Inc., Buffalo Grove, Ill.), equipped, respectively, with a sharp (Shore D), spherical (Shore 0), or flat (Shore A) probe. Four samples were stacked and shuffled for each hardness measurement; and each specimen tested was conditioned by placing it in 50 percent relative humidity for five days at 23° C. before testing and using methodology outlined in ASTM D2240-15 (2015) to improve the repeatability of the hardness tests.

As used herein, the term "SG" or "specific gravity" refers to the weight/volume ratio of a rectangular cut out of a polishing pad or layer in accordance with the present invention. Density is equivalent in value to SG.

As used herein, the term "substantially flush" means within 150 μm or, preferably, within 50 μm of a given surface but not above that given surface.

As used herein, the term "substantially flat" means that a given surface is within 150 μm or, preferably, within 50 μm of being perfectly two dimensional or a perfect plane segment.

In accordance with the present invention, CMP polishing pads comprise one or more flanged endpoint detection windows that adhere well to the pad material. A flanged endpoint detection window allows greater landing area for adhesion, both to the top pad or polishing layer and to the subpad. The one or more flanged endpoint detection windows to sit between the top and sub pads, allowing the window to have substantially similar compressibility to the overall CMP polishing pad for minimizing process impact. The diameter of the flange is selected to be within the exclusion area of the CMP polishing pad, thereby limiting any irregularity in how the CMP polishing pad responds to endpoint detection to a small area of the pad that hydroplanes below the substrate surface. Accordingly, the flange diameter and groove pattern are coordinated to minimize process impact.

The top pad or (i) polishing layer includes a recess or recessed portion for the flange of the (iii) endpoint detection window so that the detection portion of the endpoint detection window lies flush with the top of the (ii) subpad.

In accordance with the CMP polishing pads of the present invention, both sides of the flange of the endpoint detection window are adhered to the pad assembly, one side to the sub pad and the other side to the top pad or polishing layer.

In accordance with the present invention, the endpoint detection window may, preferably, include a recess for platen instrumentation, such as an eddy current sensor.

The present invention further provides a method of making a CMP polishing pad according to the present invention, comprising: providing a CMP polishing layer having a polishing surface as well as grooves and one or more apertures; separately, forming an endpoint detection window from a moldable polymer or reaction mixture; interfacing the endpoint detection window with the polishing layer to provide a chemical mechanical polishing pad; wherein the endpoint detection window is a window shaped to fit snugly within the dimensions of the aperture and the recessed portion of the polishing layer, allowing for any adhesive layer.

Generally, in casting to form the endpoint detection windows of the present invention, a vacuum is applied to the reaction mixture before the molding step to remove or prevent the formation of pores or bubbles.

Preferably, the endpoint detection windows of the present invention can be formed from reaction mixtures containing as one component (A) a cycloaliphatic di- or poly-isocyanate and, as the other component a polyol mixture of (i) a polymeric diol and (ii) a triol in a weight ratio of from 1.6:1 to 5.2:1 and a catalyst chosen from a tin containing catalyst in the amount of from 0.00001 to 0.1 wt. % or an amine catalyst in the amount of from 0.01 to 1 wt. %, all weight percents based on the total solids weight of the reaction mixture. The polymeric diol may be a polycarbonate diol having a molecular weight of from 500 to 1,000, or preferably, from 500 to 800. The mole ratio of isocyanate groups in (A) the cycloaliphatic diisocyanate or polyisocyanate to the number of moles of hydroxyl groups in the (B) polyol mixture ranges from 0.9:1 to 1.10:1. Such reaction mixtures insure the hardness of endpoint detection windows, thereby enabling the provision of hard CMP polishing pads with endpoint detection windows that do not bulge or buckle from the surface thereof during or after processing.

The chemical mechanical polishing pads of the present invention further comprise at least one additional layer interfaced with the polishing layer, such as a sub pad. The additional layer can have a slightly smaller opening or aperture than the polishing layer of the CMP polishing pad which is concentric with or having the same center point as the hole, aperture or opening in the polishing layer so as to enable optical detection while providing a shelf that the endpoint detection window can rest upon and interface with. Preferably, the polishing layer is interfaced with the at least one additional layer using an adhesive. The adhesive can be selected from pressure sensitive adhesives, hot melt adhesives, contact adhesives and combinations thereof. Preferably, the adhesive is a hot melt adhesive or a pressure sensitive adhesive. More preferably, the adhesive is a hot melt adhesive.

The present invention is illustrated by reference to the figures.

As shown in FIG. 1, a top view of a CMP polishing pad with grooves (11), reveals the top surface of a polishing layer (10), a detection area of a flanged endpoint detection window (14) and an exclusion zone (12) in the polishing layer where there are no grooves (11). The exclusion zone (12) corresponds in lateral dimension to the each of the recessed portion (not shown) in the underside of the polishing layer (10) and the flange (not shown) of the endpoint detection window (14).

Figure 2:
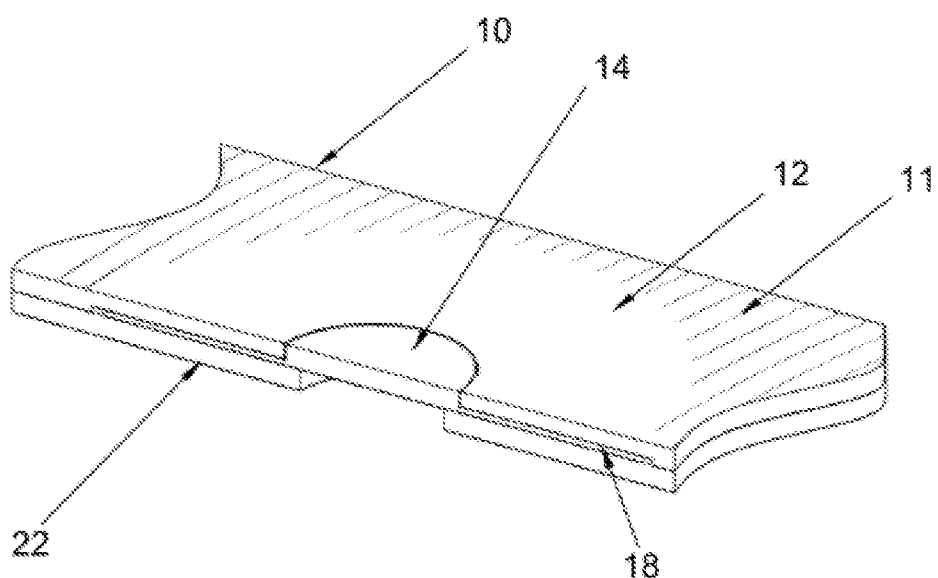
FIG. 2 is a three quarter view of a cutaway of a CMP polishing pad revealing a flanged endpoint detection window and a subpad.

As shown in FIG. 2, a three quarter view of a cutaway of a CMP polishing pad reveals a polishing layer (10), a flanged endpoint detection window (14), and a sub pad (22). There are no grooves (11) in the area immediately above the window flange (18), the area designated as the exclusion zone (12).

Figure 3A:
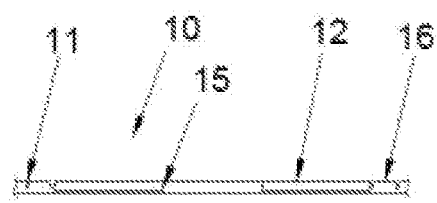
FIG. 3A is a side view of a cutaway portion of a polishing layer not containing an endpoint detection window.

As shown in FIG. 3A, a side view of a cutaway portion of a polishing layer (10) not containing an endpoint detection window, wherein the polishing layer contains a top polishing grooved area (16), an aperture (15) for the detection area of an endpoint detection window (not shown) and an exclusion zone (12) where there are no grooves (11).

Figure 3B:
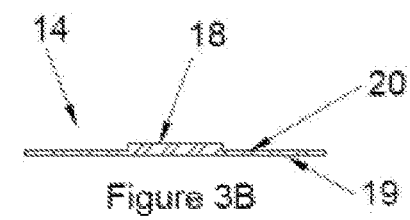
FIG. 3B is a side cutaway view of a flanged endpoint detection window with an adhesive for attachment to a polishing layer.

As shown in FIG. 3B, a side cutaway view of a flanged endpoint detection window (14) in accordance with the present invention, has a detection area (18) and an adhesive (20) applied to the flange (19) whereby the endpoint detection window can be attached to a polishing layer.

Figure 3C:
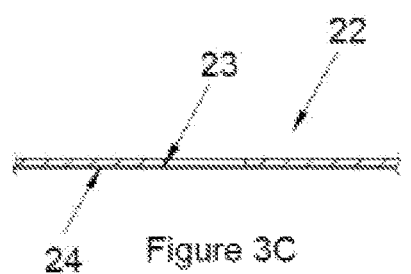
FIG. 3C is a side view of a cutaway portion of a sub pad attached to a platen for polishing.

As shown in FIG. 3C, a side view of a cutaway portion of a sub pad (22), reveals an aperture (23) and an adhesive layer (not labelled) on each of the flat top surface of the sub pad (22) and its underside (24), whereby the sub pad (22) is attached to a platen (not shown) for polishing.

In accordance with the present invention, methods of polishing a substrate, comprise: Providing a substrate selected from at least one of a magnetic substrate, an optical substrate and a semiconductor substrate; providing a chemical mechanical (CMP) polishing pad having an endpoint detection window as in any one of items 1 to 3, above; creating dynamic contact between a polishing surface of the polishing layer of the CMP polishing pad and the substrate to polish a surface of the substrate; and, conditioning of the polishing surface of the polishing pad with an abrasive conditioner.

The present invention also provides a method of polishing a substrate, comprising: providing a chemical mechanical polishing apparatus having a platen, a light source and a photosensor; providing at least one substrate; providing a chemical mechanical polishing pad as in any one of items 1 to 3, above; installing onto the platen the chemical mechanical polishing pad; optionally, providing a polishing medium at an interface between the polishing surface and the substrate; creating dynamic contact between the polishing surface and the substrate, wherein at least some material is removed from the substrate; and, determining a polishing endpoint by transmitting light from the light source through the endpoint detection window and analyzing the light reflected off the surface of the substrate back through the endpoint detection window incident upon the photosensor.

In accordance with the present invention, methods of using the endpoint detection windows is specifically a method of detecting the end-point of polishing by irradiating a substrate via a CMP polishing pad through the endpoint detection window, with a light beam, and monitoring an interference signal generated by reflection of the light beam. As the light beam, for example, a white LED or white light using a halogen or deuterium lamp having a light of wavelengths ranging from 200 to 1100 nm is generally used. In such methods, the end-point is determined by knowing an approximate depth of surface unevenness through monitoring of a change in the thickness of a surface layer of a wafer. When such change in thickness becomes equal to the thickness of the unevenness, the CMP process is finished. Accordingly, one determines a CMP polishing endpoint by transmitting light from the light source through the endpoint detection window and analyzing the light reflected off the surface of the substrate back through the endpoint detection window incident upon the photosensor. As a method of detecting the end-point of polishing by such optical means and a polishing pad used in the method, various methods and polishing pads have been proposed.

As used in the methods and otherwise herein, an "endpoint detection window" provides detection during polishing of one, more than one or all layers of a given substrate, including the end of polishing of a single material, layer or feature of a substrate, such as any one or more of a dielectric, a mask, a filler, a conductive layer and/or a semiconducting material, gate forming structure, relational structure, trench forming structure, or via forming structure.

During polishing, a light beam is directed through the window to the wafer surface, where it reflects and passes back through the window to a detector (e.g., a spectrophotometer). Based on the return signal, properties of the substrate surface (e.g., the thickness of films thereon) can be determined for endpoint detection.

The polishing layer of the chemical mechanical polishing pad of the present invention has a polishing surface adapted for polishing a substrate. Preferably, the polishing surface is adapted for polishing a substrate selected from at least one of a magnetic substrate, an optical substrate and a semiconductor substrate. More preferably, the polishing surface is adapted for polishing a semiconductor substrate.

The polishing layer of the chemical mechanical polishing pad of the present invention is preferably made of a polymeric material comprising a polymer selected from polycarbonates, polysulfones, nylons, polyethers, polyesters, polystyrenes, acrylic polymers, polymethyl methacrylates, polyvinylchlorides, polyvinylfluorides, polyethylenes, polypropylenes, polybutadienes, polyethylene imines, polyurethanes, polyether sulfones, polyamides, polyether imides, polyketones, epoxies, silicones, EPDM, and combinations thereof. Preferably, the polishing layer comprises a polyurethane. One of ordinary skill in the art will understand to select a polishing layer having a thickness suitable for use in a chemical mechanical polishing pad for a given polishing operation. Preferably, the polishing layer exhibits an average thickness of 20 to 150 mils (more preferably 30 to 125 mils; most preferably 40 to 120 mils).

Preferably, the polishing surface has macrotexture selected from at least one of perforations and grooves. Perforations can extend from the polishing surface part way or all the way through the thickness of the polishing layer. Preferably, grooves are arranged on the polishing surface such that upon rotation of the chemical mechanical polishing pad during polishing, at least one groove sweeps over the surface of the substrate being polished. Preferably, the polishing surface has macrotexture including at least one groove selected from the group consisting of curved grooves, linear grooves and combinations thereof.

Preferably, polishing layer of the chemical mechanical polishing pad of the present invention has a polishing surface adapted for polishing the substrate, wherein the polishing surface has a macrotexture comprising a groove pattern formed therein. Preferably, the groove pattern comprises a plurality of grooves. More preferably, the groove pattern is selected from a groove design. Preferably, the groove design is selected from the group consisting of concentric grooves (which may be circular or spiral), curved grooves, cross hatch grooves (e.g., arranged as an X-Y grid across the pad surface), other regular designs (e.g., hexagons, triangles), tire tread type patterns, irregular designs (e.g., fractal patterns), and combinations thereof. More preferably, the groove design is selected from the group consisting of random grooves, concentric grooves, spiral grooves, cross-hatched grooves, X-Y grid grooves, hexagonal grooves, triangular grooves, fractal grooves and combinations thereof. Most preferably, the polishing surface has a spiral groove pattern formed therein. The groove profile is preferably selected from rectangular with straight side walls or the groove cross section may be "V" shaped, "U" shaped, saw tooth, and combinations thereof.

The present invention will now be illustrated in detail in the following non-limiting Examples:

In the following Examples, unless otherwise stated, all pressures are standard pressure (101 kPa) and all temperatures are ambient or room temperature (~22-23° C.). The following raw materials were used in the Examples:

Polishing layer A was an IKONIC 4000™ Series polyurethane polishing layer with a density of 0.75 g/cc and a hardness of 57 shore D (The Dow Chemical Co., Midland, Mich.);

Sub pad A was a polyurethane foam with density of 0.637 g/cc and hardness of 65 shore O (ASTM D2240-15 (2015), pressure sensitive adhesive was an acrylic resin containing adhesive, and the reactive hot melt comprised an aliphatic polyester polyol.

Window materials included: H12MDI: methylene bis (4-cyclohexylisocyanate), a.k.a. dicylohexylmethane-4,4'-diisocyanate;

Diol 1: a linear, hydroxyl-terminated, aliphatic polycarbonate diol with an average molecular weight of approx. 650 g/mol;

Polycarbonate triol 1: Trimethylol propane or TMP, MW (molecular weight): 134.17 g/mol;

Catalyst: dibutyltin dilaurate catalyst, MW (molecular weight): 631.56;

Polyisocyanate prepolymer 1: polyether-containing polyisocyanate polymer, was prepared with an aliphatic diisocyanate with available isocyanate content (% NCO) of 7.35-7.65 wt. %;

Curative: 3,5-diethyltoluene-diamine; and

Light stabilizer: cyanoacrylic acid ethylhexyl ester.

Example 1: Hard Flanged Window Containing Pad

A flanged material was vacuum cast using 51 wt. % H12MDI, 37 wt. % diol 1, 12 wt. % polycarbonate triol, all weights based on total weights of polyol and isocyanate materials, and catalyst, to form a solid disk without bubbles. The disk was then milled into the flanged window shape.

Nominal flange thickness was 50 μm; detection area thickness was 2 mm; detection area was circular and 18 mm in diameter, and the flange was circular and 30 mm in diameter. One 50 μm deep; 30 mm recessed area was milled in the underside of the polishing layer A concentric with an 18 mm wide aperture through the polishing layer. Pressure sensitive adhesive was applied to the recessed area and the flanged window was inserted into the recessed area in the polishing layer, such that the detection area surface was flush with the top surface of the polishing layer A. Reactive hot melt adhesive was applied to the top surface of sub pad A and used to permanently adhere the polishing layer A (containing the flanged window) to the sub pad.

Example 2: A CMP Polishing Pad with Prepolymer Flanged Windows

A flanged window material was cast into a cylinder having the diameter desired of the exclusion area from a mixture of 88 wt. % polyisocyanate prepolymer 1, 11 wt. % curative, and light stabilizer. The casting was skived into sheets of 2 mm thick, then sheets then milled into a flanged window shape. Nominal flange thickness was 50 μm; detection area thickness was 2 mm; detection area was circular and 18 mm in diameter; and the flange was circular and 30 mm in diameter, which was the size of the exclusion area. One 50 μm deep, 30 mm recessed area was milled in the underside of polishing layer A concentric with an 18 mm wide aperture through the polishing layer. Reactive hot melt was applied to the recessed area; and the flanged window was inserted into polishing layer A such that the detection area surface was flush with the top surface of the polishing layer. Reactive hot melt adhesive was also applied to the top surface of sub pad A and used to permanently adhere polishing layer A (containing the flanged window) to sub pad A.

Example 3: Leakage Testing

The CMP polishing pads of Examples 1 and 2 were tested for effectiveness against leakage using two methods. In the first method, a vacuum was applied to the underside of the CMP polishing pad using a porous plate. A liquid dye was placed on the polishing surface, the exclusion zone, and the window detection area and allowed to flow into the pad material. After 10 hours, the CMP polishing pad was removed and the porous plate was inspected for dye discoloration. No discoloration was found, indicating that the flanged window had not leaked.

The second experiment comprised placing each CMP polishing pad on a CMP platen within a functioning CMP machine. The polishing layer top surface, exclusion zone, and window detection area were then subjected to a rotating surface conditioning disk at 2.3 kg downforce for 60 minutes while rinsing with deionized water. The CMP polishing pad was then removed from the platen and inspected for evidence of leakage. None was found.

We claim:

1. A chemical mechanical (CMP) polishing pad for polishing a substrate chosen from at least one of a magnetic substrate, an optical substrate and a semiconductor substrate comprising (i) a CMP polishing layer or top layer of a polymer material having in the CMP polishing layer on the top layer (a) a top surface having in it a series of grooves, having for each of one or more endpoint detection windows an aperture A extending all the way through the polishing layer having a center point when viewed looking in a direction normal down on the top of the polishing layer when in use and an exclusion zone free of grooves adjacent the aperature A, the exclusion zone having a lateral dimension, and (b) a substantially flat underside that contains for each of the one or more endpoint detection windows a recessed portion having a constant depth that extends laterally coterminous with the lateral dimension of each exclusion zone; (ii) a sub pad or sub layer of a polymeric material, having a substantially flat top surface, having a flat underside surface and having for each of one or more endpoint detection windows an aperture extending all the way through the sub pad and having a center point aligned to match the center point of each aperture A in the polishing layer; and (iii) one or more endpoint detection windows each window having a flange adapted to fit snugly into the recessed portion of the underside of the polishing layer, having a thickness equal to or, to accommodate an adhesive layer, slightly less than the depth of the recessed portion of the (i) polishing layer, having a detection area that fits snugly into an aperture in the (i) polishing layer so that its top surface that lies substantially flush with the top surface of the (i) polishing layer.

2. The chemical mechanical (CMP) polishing pad as claimed in claim 1, wherein the polymer material of the CMP polishing layer is a polyurethane foam layer.

3. The chemical mechanical (CMP) polishing pad as claimed in claim 1, wherein the (ii) a sub pad or sub layer of a polymeric material is a polyurethane foam material.

4. The chemical mechanical (CMP) polishing pad as claimed in claim 1, wherein the (iii) one or more endpoint detection windows is a transparent polymer window.

5. The chemical mechanical (CMP) polishing pad as claimed in claim 1, wherein each of the (iii) one or more endpoint detection windows is adhered to each of the (i) polishing layer and the (ii) sub pad via ultrasonic welding or with an adhesive chosen from pressure sensitive adhesives, hot melt adhesives, contact adhesives and combinations thereof.

6. The chemical mechanical (CMP) polishing pad as claimed in claim 4, wherein each of the (iii) one or more endpoint detection windows is adhered to the (i) polishing layer with a pressure sensitive adhesive and is adhered to the (ii) sub pad with a pressure sensitive adhesive or a hot melt adhesive.

7. The chemical mechanical (CMP) polishing pad as claimed in claim 1, wherein the one or more endpoint detection windows wherein the CMP polishing pad contains no gap or open space of greater than 150 µm in any dimension within the lateral area bound by the flange of each of the one or more (iii) endpoint detection windows and between the underside of the sub pad and the top surface of the polishing layer.

8. The chemical mechanical (CMP) polishing pad as claimed in claim 1, comprising from one to three (iii) endpoint detection windows.

* * * * *